United States Patent [19]

Millard et al.

[11] 4,188,706
[45] Feb. 19, 1980

[54] METHOD FOR MAKING A PLURALITY OF SOLID ELECTROLYTE CAPACITORS AND CAPACITORS MADE THEREBY

[75] Inventors: Richard J. Millard, Williamstown, Mass.; David M. Cheseldine, Bennington, Vt.

[73] Assignee: Sprague Electric Company, North Adams, Mass.

[21] Appl. No.: 897,463

[22] Filed: Apr. 18, 1978

[51] Int. Cl.$^2$ ............................................. B01J 17/00
[52] U.S. Cl. ...................................... 29/570; 29/583; 29/591
[58] Field of Search .................. 29/570, 580, 583, 591

[56] References Cited
U.S. PATENT DOCUMENTS

| | | | |
|---|---|---|---|
| 3,458,775 | 7/1969 | Flaks | 29/570 |
| 3,469,294 | 9/1969 | Hayashi | 29/570 |
| 3,579,813 | 5/1971 | Tomiwa | 29/570 |
| 3,889,357 | 6/1975 | Millard | 29/570 |

*Primary Examiner*—W. C. Tupman
*Attorney, Agent, or Firm*—Connolly and Hutz

[57] ABSTRACT

An array of porous oxide-filmed tantalum pads that are sintered to a tantalum foil, each have a composite $MnO_2$ layer formed thereover by the steps of filling the pad pores with a manganous nitrate solution by capillarity from a sponge-like reservoir pressed gently against the pads, pyrolyzing, screen printing over the first $MnO_2$ sublayer a thixotropic mixture of $MnO_2$ powder and manganous nitrate and pyrolyzing, and again depositing from the sponge-like reservoir a quantity of manganous nitrate and pyrolyzing again. A counterelectrode is formed over the composite $MnO_2$ layer at the top of each pad. A temporary masking layer is deposited over each of the counterelectrodes. The streets separating the pads, and the pads themselves are flooded with an insulative resin. Excess resin is removed with a squeegee and the resin is cured. The masking layer is removed and slots are gouged in the resin in the alternate of the columnar streets, which alternate streets are wider than the others. A U-shaped nickel channel is welded to the substrate in the slots and the substrate is severed along lines that are central to the channel to produce discrete flip-chip style capacitors.

17 Claims, 6 Drawing Figures

METHOD FOR MAKING A PLURALITY OF SOLID ELECTROLYTE CAPACITORS AND CAPACITORS MADE THEREBY

BACKGROUND OF THE INVENTION

The present invention relates to a method for making a plurality of solid tantalum capacitors on a valve-metal substrate, and more particularly to a low cost batch manufacturing method for making discrete flip-chip style capacitors.

There is disclosed in the U.S. Pat. to Millard et al, No. 3,889,357 issued June 17, 1975, assigned to the same assignee as is the present invention, a method for making capacitors by screen printing an array of pads of a tantalum containing ink on a tantalum substrate to form porous tantalum pads that will serve as capacitor anodes. After forming a tantalum oxide film over the pad surfaces, a solid electrolyte is formed by pyrolysis of manganous nitrate over the dielectric film. Special precautions and a series of special steps are taken to keep the $MnO_2$ out of the streets that separate the pads of the array. A flip-chip style capacitor is also produced by welding separate nickel bars to the substrate adjacent to each pad, which process tends to be difficult to control.

An improved counterelectrode system for solid electrolyte capacitors is described by Cheseldine in U.S. Pat. application Ser. No. 830,310 filed Sep. 2, 1977, and assigned to the same assignee. It is also mentioned therein that the streets may be flooded with an insulating resin, and after curing the resin, slots are cut therein in which a conductive resin is cast to form anode terminals. This is also a difficult procedure to control since the height of the insulative resin layer is determinative of the height of anode terminals. An alternative anode terminal consists of a metal bar being welded to the substrate.

It is an object of the present invention to provide a low cost batch method for making a plurality of flip-chip-mountable solid electrolyte capacitors.

It is a further object of the present invention to provide such a method that is comprised of relatively easily executed and non-critical steps.

SUMMARY OF THE INVENTION

A plurality of solid electrolyte capacitors are made by a batch method including forming rows and columns of porous valve-metal pads on a valve-metal substrate, forming a valve-metal film over the surfaces of each pad, selectively depositing a composite manganese dioxide layer over the film of each pad, and applying a counterelectrode layer over each manganese dioxide layer.

The selective deposition of the composite manganese layers is accomplished by first saturating a soft porous material with an aqueous solution of manganous nitrate, pressing the saturated material lightly against the top surfaces of the pads to selectively fill the pores of the pads by capillarity and heating the pads to pyrolyze and transform the manganous nitrate therein into a first manganese dioxide layer overlying the dielectric valve-metal oxide film. These steps may be repeated one or more times to fill the pad pores with $MnO_2$.

Then a second and relatively dense $MnO_2$ layer is formed over the first by selectively screen printing a thixotropic mixture of manganous nitrate and colloidal $MnO_2$ powder over the top surfaces of each pad. This layer is subsequently pyrolyzed. Next, the same steps which were employed to build the first layer are used to create a third $MnO_2$ layer. The composite $MnO_2$ layer is thus composed of three layers. A conductive counterelectrode layer is deposited over the composite $MnO_2$ layer on each pad.

A temporary masking layer, such as a standard photoresist material is selectively applied over each counterelectrode. The streets separating the rows and columns of pads and the counterelectroded pads themselves are flooded with a liquid insulating resin, preferably an elastomeric resin. The portion of the liquid resin overlying the counterelectroded pad tops is removed by squeegeeing with a straight resilient blade. The resin is heat cured. The masking layer is then removed leaving the counterelectrodes completely free of the insulating resin.

The aforementioned array of pads forms a grid of streets which separate the rows and columns. Each of the alternate of the columnar streets is substantially wider than the remaining columnar streets. A slot is formed in the center of each of the wider columnar streets and a U-shaped metal channel is placed, bottom down, in each slot. A bottom portion of each channel is attached and electrically connected to the substrate surface. The substrate and each channel is severed along lines that are central to the channels to produce multiple capacitor assemblies of the flip-chip-mounting type. The wide streets are each made at least as wide as the sum of the width of each of the other columnar streets plus the width of the slots so that room is left for a sufficiently thick insulative resin about the adjacent capacitor pad.

The substrate may be further severed along lines centrally located between each of the remaining columnar streets. The substrate may further be severed along lines centrally located between the pad rows to produce a plurality of individual capacitors, each mountable by face bonding in a conventional flip-chip manner.

The individual capacitors so produced, each have an anode terminal in the form of an L-shaped channel. The side plate of the terminal is adjacent the capacitor pad relative to the bottom plate of the terminal. The bottom plate is connected to the substrate piece which supports the capacitor pad. An insulative resin surrounds and seals against the entire periphery of the pad including the periphery of the counterelectrode layer.

DESCRIPTION OF THE PREFERRED EMBODIMENTS

Figure 1:
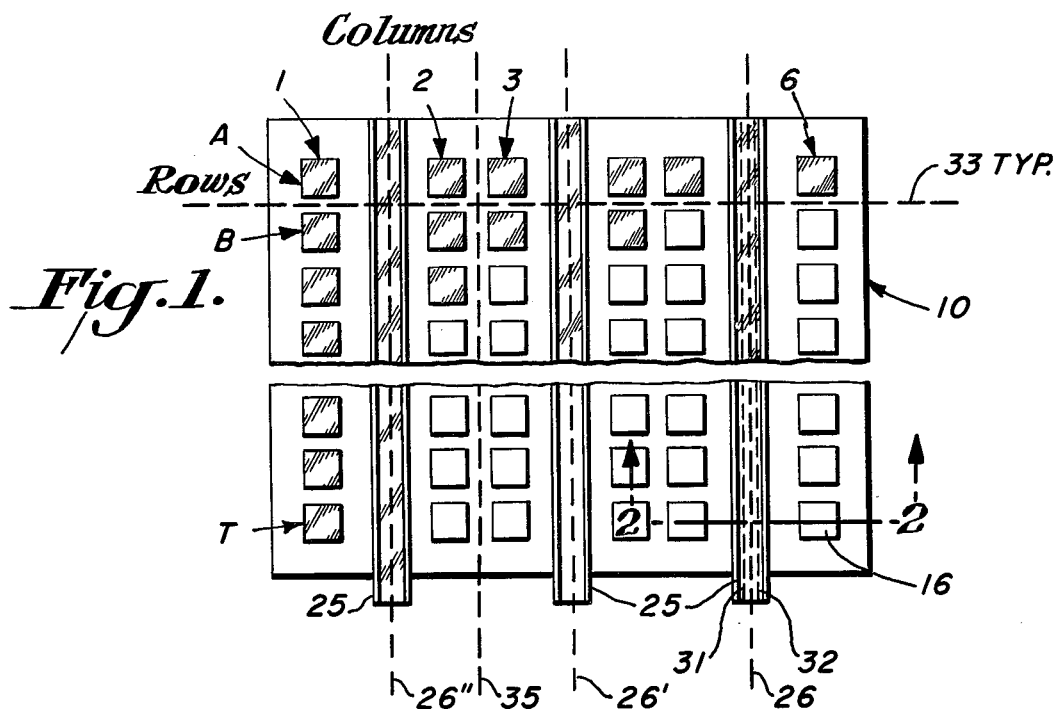
FIG. 1 shows in top view an array of solid-electrolyte tantalum capacitors being formed on a single tantalum substrate.
Figure 2:
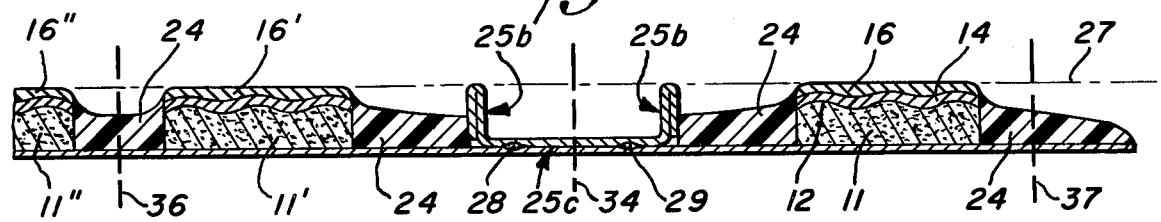
FIG. 2 shows in enlarged side sectional view, taken in section 2—2, three of the capacitors of FIG. 1.

With reference to FIGS. 1 and 2, a tantalum substrate or sheet 10, having a thickness of 0.125 mm, has formed thereon a rectangular array of porous tantalum pads 11. The pads 11 are made by screen printing one or more layers of a mixture of tantalum powder and a solution of an organic binder on a surface of the substrate 10, sintering to burn off the binder and to sinter-bond the tantalum particles to each other and the supporting substrate 10. A conventional tantalum oxide film 12 is then anodically formed over the surfaces of the pads and the substrate (not shown). A more complete account of the foregoing steps are provided in the above-mentioned U.S. Pat. No. 3,889,357 which is incorporated by reference herein. The patent is assigned to the same assignee as the present invention.

The array of pads has six columns 1 through 6, drawn vertically in FIG. 1, and twenty rows A through T, shown horizontally in FIG. 1. It is a regular rectangular array wherein a rectangular grid of streets is formed in the spaces between the rows and columns of pads 11. The horizontal row streets (as shown in FIG. 1) are of a uniform width (1 mm), being approximately half the width (2 mm) of the pads. The vertical columnar streets have the same width (1 mm) except that the alternate of the columnar streets are substantially wider (5 mm), e.g. between columns 1 and 2.

A solid electrolyte layer 14 is applied over the dielectric film 12 by the following steps.

A porous filter paper is laid over an open mesh steel screen (150 wires per inch) and the combination is saturated with an aqueous solution of manganous nitrate of 1.45 specific gravity. The screen and the paper are then inverted so that the paper faces downwardly, the paper being adhered to the screen by the solution. By applying a general pressure to the screen, the paper is lightly pressed against the tops of the pad 11 and the manganous nitrate fills the portion of the pads with the solution by capillarity. The pressure may be conveniently applied by moving a sponge roller over the screen. The screen serves to provide the stiffness necessary to prevent the saturated paper from touching the street surfaces of the substrate. The pad carrying substrate is then heated to pyrolize the manganous nitrate. These steps of impregnation and pyrolysis are repeated several times in order to fill the pores of the pads 11.

A thixotropic mixture consisting of 70% of a 1.45 specific gravity manganous nitrate solution, 38% of a colloidal manganese dioxide powder, and 2% of a colloidal silica is prepared for subsequent screen printing over the top surfaces of the pad. This type of mixture is described by Fournier et al in U.S. Pat. No. 3,950,842 issued Apr. 20, 1976 and assigned to the same assignee. The aforementioned top surface is uppermost as seen in FIG. 2.

After selectively screen printing the thixotropic mixture on to the surface of the pads, the substrate is covered with a relatively coarse $MnO_2$ powder.

This selective screen printing process advantageously leaves the sides of the pads and the streets between the pads free of the thixotropic mixtures. During pyrolysis of this screen printed layer, a very dense layer of manganese dioxide is formed over the tops of the pads, and the coarse $MnO_2$ powder is embedded in the outer surface providing a rough surface to which the next layer may be tightly bonded.

Further top coats of manganese dioxide are applied over the dense layer by the aforementioned selective process of pressing a paper having been saturated with a manganous nitrate solution of about 1.55 specific gravity, against the tops of the pads and pyrolizing. These steps may be repeated one or more times to achieve a further roughening of the top surface of the composite manganese dioxide layer 14 to which a subsequently applied counterelectrode layer 16 will readily adhere.

Figures 3, 6:
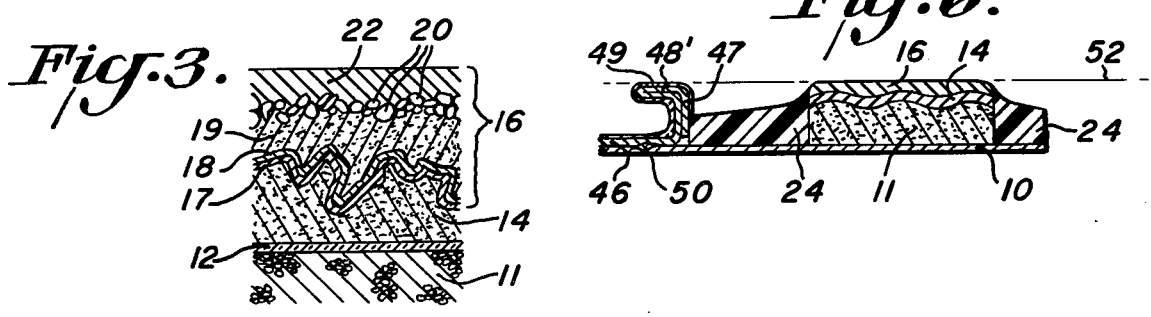
FIG. 3 shows a magnified detail of one of the capacitors of FIG. 2 in the same side section 2—2.
FIG. 6 shows in side sectional view yet another discrete capacitor of this invention.

A roller having a spongey or resilient porous surface is soaked in a liquid suspension of graphite particles (Aquadag) having about 6% solids content by weight. The wet roller is rolled over the pad tops to selectively deposit a thin layer of the graphite solution (Aquadag) over the pads, and not the streets. This may alternatively be accomplished by brushing, but the roller method aforementioned is greatly preferred as being simpler, faster and less critical in control. The Aquadag layer 17 is then dried and essentially conforms to the underlying $MnO_2$ layer 14 as illustrated in FIG. 3.

The aforementioned steps of selectively applying manganous nitrate and pyrolizing are effective in providing a layer 14 of manganese dioxide having a thickness of about 0.2 mm over the pad. These steps are generally effective in keeping the street surfaces of the substrate free of manganese dioxide. As is noted in the above-mentioned U.S. Pat. No. 3,889,357, it is necessary to keep the substrate surface free of $MnO_2$ to avoid creating electrical current paths in shunt with the tantalum oxide dielectric film when the substrate is later cut in the streets to separate the individual capacitors. However, it has been found that sometimes due to splashing during the application of manganous nitrate to the tops of the pad from a saturated paper, minor regions in some of the streets inadvertently acquire a thin film of manganese dioxide.

In order to remove any such inadvertently formed $MnO_2$ film in the streets, the substrate is completely submerged in a solution of acidified hydrogen peroxide and water to dissolve the unwanted film. A minor and insignificant surface portion of the $MnO_2$ layer 14 is simultaneously removed, and its rough character is retained. The submersion is terminated when the streets are visually clean. That is, the clear characteristic color or light interference hue, imparted to the substrate surface by the tantalum oxide film there, is uniformly present.

At this point in the process and other points during building the composite $MnO_2$ layer 14, the substrate may be returned to the anodizing bath wherein a voltage is applied between the bath and the substrate to heal or isolate high leakage paths which may have developed in the dielectric film 12.

A silver paint which is a mixture of silver particles in an acrylic binder, is selectively roller printed over the thin graphite layer 17, and cured to form a solid conductive layer 18 that is tightly bonded to the graphite and the supporting rough surface of the solid electrolyte layer 14.

A liquid resin containing copper powder is selectively applied over the silver layer 18 by any suitable means such as screen printing or by roller. Prior to curing the conductive resin, dry copper particles 20 are sprinkled over the wet resin surfaces. After curing the resin, the conductive resin layer 19 is bonded to the silver layer 18 and acquires a rough and readily solderable outer surface due to the sprinkled copper particles 20 that become partially embedded in and bound by the cured resin 19. These later steps for forming a highly solderable and tightly bonded counterelectrode layer 16 over each pad are more fully described by Cheseldine in the aforementioned patent application Ser. No. 830,310.

The conductive counterelectrode layer 16, over each pad, at this point in maufacturing, includes the thin layer of graphite 17, the silver layer 18 and the conductive copper layer 19 and 20. An overlayer of solder 22 may next be applied over the copper by dipping the substrate in molten solder and slowly withdrawing it from the solder pot. The counterelectrode layer 16 then includes the graphite, silver and copper layers, and a solder overlayer 22. However, as will be further discussed, it is preferred to add the solder layer 22 at a later point in the process.

A temporary protective or masking coating is then applied to the top surfaces of the pads over the counterelectrode layer 16. This coating is a water soluble material, namely Screen Star #82, supplied by Bond Adhesives Co., Adrian, Mich. A roller is coated with the liquid masking material and subsequently rolled over the pads to selectively apply it just over the pads. The deposited wet layer is dried to form a solid masking layer. Many other materials will be suitable for forming the masking layer.

An elastomeric encapsulating resin, Silgan J-500, made by SWS Silicones Corp., Jersey City, N.J., is poured over the top surfaces of the substrate and pads to flood the pads and the streets. Other elastomeric resins, also having a relatively high temperature withstanding characteristic, will also be suitable. A resilient straight edged wiper or squeegee is then wiped over the pad surfaces to substantially remove the liquid resin from the pad tops and to leave an amount of resin in the streets having an average thickness less than the thickness of the pads. The squeegee is elevated everywhere with respect to the substrate surface by contact with the pad surfaces, the wiping blade being held askew relative to the rectangular array of pads during wiping. Thus the surface of the resin 24 above the substrate surface is highest at the pad sides where it is about equal to the pad height and lowest in the center of the streets. The resin 24 is in this manner caused to surround each pad and to seal against the counterelectrode 16 of each pad. It is cured at room temperature in about 15 hours.

A film of resin may remain over the protective coating that overlies the counterelectroded pads. This film is removed by removing the protective coating. The substrate is submersed in water to dissolve the protective coating and wash away the unwanted resin film, leaving a clean counterelectrode surface.

A strip portion of the cured encapsulant is next removed in a central region of each wide columnar street, leaving slots in the resin. This may be accomplished by a gouging tool which has a U-shaped chisel edge. In order to remove the tantalum oxide film at the bottom of the slots, the bottom of the slots are sand-blasted directing a needle fine sand-blasting nozzel along the slots. The oxide film on the bottom side of the substrate may also be removed by sand-blasting to obtain good contact of the welding electrode there.

A U-shaped nickel channel 25 has two side plate portions (25a and 25b) and a bottom plate portion 25c as illustrated in FIG. 2. The width of the channel, measured from the outer surfaces of the two side plate portions, respectively, is equal to or may be less than the width of the slots that were gouged in the resin. The channel 25 is formed from an elongated 2 mil (0.05 mm) thick nickel foil. Two opposite side portions of the elongated foil are bent upwardly about at right angles to a central portion along lines that are equidistant from and parallel to the major axis 26 of the elongated foil. The outer half of each side portion is then folded outwardly and down 180° so as to lie flush with the inner half thereof, respectively. Thus the side plate portions 25a and 25b of the channel are comprised of two thicknesses of foil as seen in FIG. 2, providing a rounded top edge which as will be seen more readily accept a uniform layer of solder and will provide a more effective anode terminal for the capacitors. This top edge lies approximately in the plane 27 defined by the top surfaces of the counterelectrode layer 16.

One such channel 25 is then placed into each slot, respectively, each channel bottom 25c is then welded to the substrate at the bottom of a slot. This is preferably accomplished by progressively forming a series of welds 28 and 29 along two paths 31 and 32, respectively, which paths are parallel to and displaced laterally on either side, respectively, of the above noted major axis 26. An electrical resistance welder may be used, periodically applying a voltage between the substrate and a rolling wheel electrode that is rolled along the paths 31 and 32 at a rate which will produce at least one weld in the channel region adjacent to each pad.

Alternatively, one row of welds (not shown) may be made along the center axis 26, each weld extending laterally to either side of the axis (e.g. to paths 31 and 32) so that after severing along the axis, a portion of each weld will remain intact on either side of the cut.

Both of the above welding methods describe a succession of discrete welds with at least one weld being in the region of the channel that is adjacent one of the pads. More than one weld in each such adjacent region is preferable. The welds may in fact be made close enough to overlap each other forming a seam weld.

A solder flux is applied over the channels 25 and the substrate 10 is then submersed into a molten solder and slowly removed to form a solder coat over the exposed channel surfaces (not shown in FIG. 2). If at this time, the counterelectrode layer 16 includes a solder layer 22, it is merely reflowed and left essentially unchanged after removing the substrate from the solder pot. If no solder layer is initially present, and the counterelectrode surface is copper, then a solder coat is newly deposited there at this solder dipping step. The latter procedure is preferred since the application of solder flux in this instance only occurs after the sides of the pads 11 are encapsulated and sealed with resin 24. Such fluxes are thus prevented from contacting the sides of the pads. Any flux residues left in these areas may cause reduced dissipation factors and early failures of the capacitors.

The substrate 10 is next mounted on a glass plate (not shown) using a DeKhotinski-Type cement or wax, namely Cenco Sealtix, and is severed with a 0.008 inch wide (0.2 mm) diamond saw. The substrate 10 and channels 25 are severed along lines 26, 26' and 26" each of which lines has a central and axial relationship to one of the channels 25. In FIG. 2, the severing along an axial line 26 corresponds to a cut along the cut line 34. Multiple capacitor assemblies having a common anode connection are thus provided.

The glass is then warmed until the severed substrate pieces may be slid off. The wax is removed from the pieces by immersing them in isopropyl alcohol at 70° C. for about 3 minutes. Each separated piece of the substrate now has two capacitors formed thereon (e.g. built about pads 11' and 11" as seen in FIG. 2) having commonly connected anodes and separate cathodes (e.g. counterelectrodes 16' and 16").

When, as is more commonly the case, it is desired to provide only single pad column assemblies, then prior to the heating and removing steps aforementioned, the substrate 10 is further severed along lines 35 centrally located within the streets separating the closely adjacent columns of pads, a corresponding cut line 36 being shown in FIG. 2. The outer peripheral portion of the substrate 10 may also be removed as indicated by a cut line 37.

Figures 4, 5:
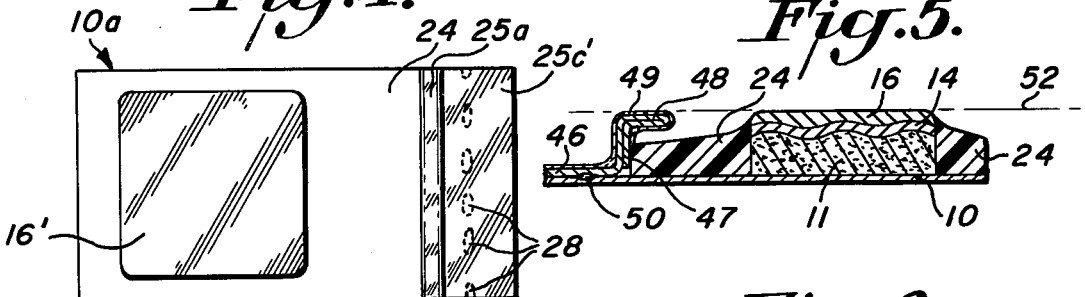
FIG. 4 shows in top view a discrete flip-chip-mountable capacitor from FIG. 2, having been separated from the assembly of FIGS. 1 and 2.
FIG. 5 shows in side sectional view another discrete capacitor of this invention.

The substrate 10 and resin layer 24 may be further severed along lines 33 that are centrally located between the adjacent pad rows to produce discrete flip-chip capacitors. Each separate substrate piece 10a is shown in FIG. 4 having a pad 11' with a counterelectrode layer 16' and an L-shaped nickel anode terminal consisting of a side plate 25a and a base plate 25c', that has been cut and separated from the channel 25. The base plate 25c' has a plurality of weld joints 28 connecting it mechanically and electrically to the substrate.

Referring to FIG. 5, an individual capacitor is shown that is similar to the capacitors depicted in FIG. 2 except that the nickel channel 25 is modified. Thus, after severing, the L-shaped anode terminal 40 has a bottom plate portion 46, a side plate portion 47 and extending at right angles from the top of the side plate is a flange portion 48. The flange portion 48 extends toward the pad 11 and has a solder coat 49. A weld joint 50 joins the bottom plate flush with the substrate 10.

In FIG. 6 the channel 25 is modified from that shown in FIG. 5 by having a flange plate 48' extending outwardly at right angles from the top edge of the side plate 47. The top surface of the counterelectrode 16 of the capacitors in FIGS. 5 and 6 defines a plane 52 that is parallel to the substrate and is about flush with the top surfaces of the flange portions 48 and 48', respectively.

What is claimed is:

1. A method for making a plurality of solid electrolyte capacitors comprising:
   (a) depositing pads of a valve-metal-powder-containing ink in rows and columns on a surface of a substrate of said valve metal;
   (b) heating to sinter in each said ink pad the particles of said powder to each other and to said substrate and to transform said ink pads into porous pads of said valve metal;
   (c) forming a valve metal oxide film over the surface of said porous pads;
   (d) saturating a soft porous material with an aqueous solution of manganous nitrate;
   (e) pressing said saturated material lightly against the top surfaces of said pads to fill the pores of said pads by capillarity with said manganous nitrate solution;
   (f) heating to pyrolize and transform said solution into a first manganese dioxide layer overlying said valve metal oxide;
   (g) selectively screen printing a thixotropic mixture of manganous nitrate and colloidal manganese dioxide powder over the top surfaces of each said pad;
   (h) heating said mixture to form a second manganese dioxide layer of high density over said pads;
   (i) saturating a soft porous material with an aqueous solution of manganous nitrate;
   (j) pressing a soft porous material having been saturated with an aqueous manganous nitrate solution against said second layers to selectively form a deposit of said solution on each said pad;
   (k) heating said deposit to form a third manganese dioxide layer over each of said second layers; and
   (l) forming an electrically conductive counterelectrode over each said third layers.

2. The method of claim 1 additionally comprising prior to said screen printing, again pressing said saturated material one or more times to the tops of said pads and after each said time, heating in order that said first layer substantially fills the pores of said pads.

3. The method of claim 1 wherein said soft porous material is a piece of filter grade paper.

4. The method of claim 3 additionally comprising placing said paper over an open mesh screen, said saturating including saturating said screen, inverting said screen so that said paper faces downwardly, said pressing being accomplished by gently pressing said screen and said paper against the tops of said pads.

5. A method for making a plurality of solid electrolyte capacitors comprising (a) depositing pads of a valve-metal-powder-containing ink in rows and columns on a surface of a substrate of said valve metal; (b) heating to sinter in each said ink pad the particles of said powder to each other and to said substrate and to transform said ink pads into porous pads of said valve metal; (c) forming a valve metal oxide film over the surface of said porous pads; and (d) applying successively over said pad surfaces a solid electrolyte and an electrically conductive counterelectrode; (e) depositing a temporary masking layer selectively over the outer surfaces of each of said counterelectrodes; (f) flooding the streets and said pads with an insulating resin, said streets being defined as the spaces that separate said rows and said columns; (g) removing by squeegeeing with a straight resilient blade, the portion of said flooding resin which overlies said pads; (h) removing said masking layers; and (i) severing said substrate along lines each of which is central to one of said streets.

6. A method for making a plurality of solid electrolyte capacitors comprising (a) depositing pads of a valve-metal-powder-containing ink in rows and columns on a surface of a substrate of said valve metal; (b) heating to sinter in each said ink pad the particles of said powder to each other and to said substrate and to transform said ink pads into porous pads of said valve metal; (c) forming a valve-metal oxide film over the surfaces of said porous pads, and applying successively over said pad surfaces a solid electrolyte and a solderable counterelectrode; (d) filling the streets, which separate said rows and said columns, with a liquid insulating resin; (e) curing said insulating resin; (f) cutting away a portion of said cured insulating resin to form slots therein that are centrally located within the alternate of the columnar of said streets, said columnar streets being defined as those which separate said columns, each of said alternate streets being substantially wider than each of the other columnar streets; (g) placing a U-shaped metal channel in each of said slots, each of said channels having a width no greater than that of the corresponding of said receiving slots; (h) attaching and electrically connecting a bottom portion of said each channel to said substrate surface; (i) severing simultaneously said substrate and said each channel along a line which has a central and axial relationship to said each channel.

7. The method of claim 6 additionally comprising severing said substrate along a line centrally within each of said other columnar streets.

8. The method of claim 6 additionally comprising severing said substrate centrally within each of another group of said streets which separate said rows.

9. The method of claim 6 wherein said attaching and connecting is achieved by progressively welding in said each channel along two paths that are parallel to and displaced laterally on either side, respectively, of said central axial line, so that after said severing along said axial line the separated halves of said each said channel remain welded to the corresponding separate pieces of said substrate.

10. The method of claim 9 wherein said attaching and connecting is achieved by periodically applying a voltage between said substrate and a wheel electrode, and rolling said wheel electrode along said path in contact with said channel at a rate relative to said periodic applying for producing at least one weld in each region of said channel that is adjacent to one of said pads.

11. The method of claim 6 wherein said attaching and connecting is achieved by progressively welding in each said channel along the major axis thereof, forming broad welds that extend laterally a substantial distance on either side of said axis.

12. The method of claim 6 wherein said channel is of a material that is weldable to tantalum and is solderable.

13. The method of claim 12 wherein said channel metal is nickel.

14. The method of claim 12 wherein said channel is made from copper clad steel foil.

15. The method of claim 6 additionally comprising applying a layer of solder over said nickel channels after said attaching.

16. The method of claim 6 wherein said cutting comprises gouging said resin with a U-shaped chisel-like tool and subsequently sand-blasting away said tantalum oxide at the bottom of said slots to positively expose said substrate surface prior to said attaching.

17. The method of claim 6 additionally comprising forming each said U-shaped channel from a flat elongated nickel foil, bending two opposite side portions of said elongated foil at about right angles to a central portion thereof along bending lines which are parallel to the major axis of said elongated foil, and folding the outer half of each said side portion 180° back adjacent to the other half of said each side portion, so that the two side plates of said U-shaped channel each consist of two thicknesses of said foil.

* * * * *